Jan. 16, 1945.　　　　E. S. PURINGTON　　　　2,367,372
RADIO DIRECTIONAL INDICATION SYSTEM
Filed Jan. 4, 1941　　　4 Sheets-Sheet 1
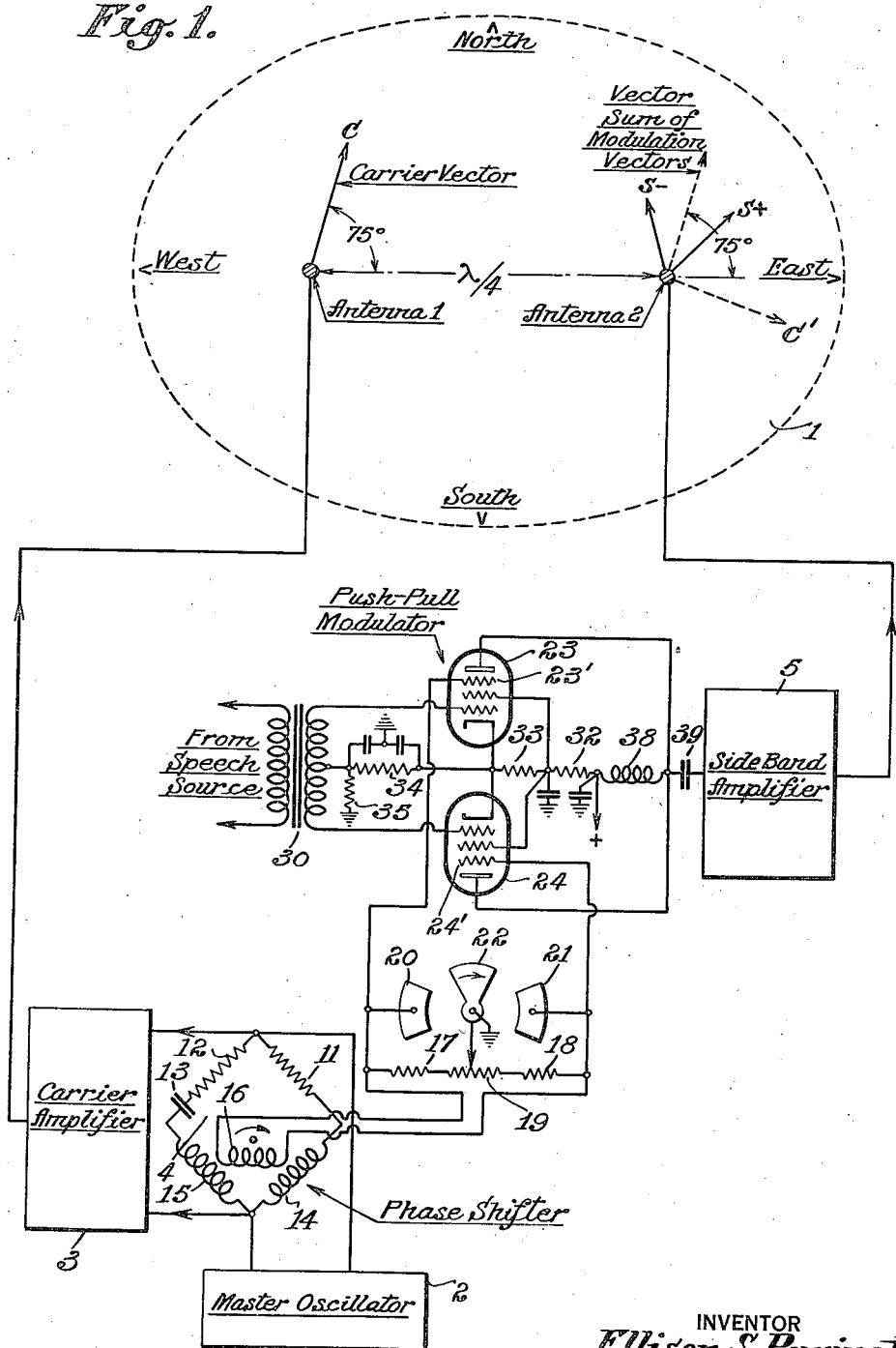

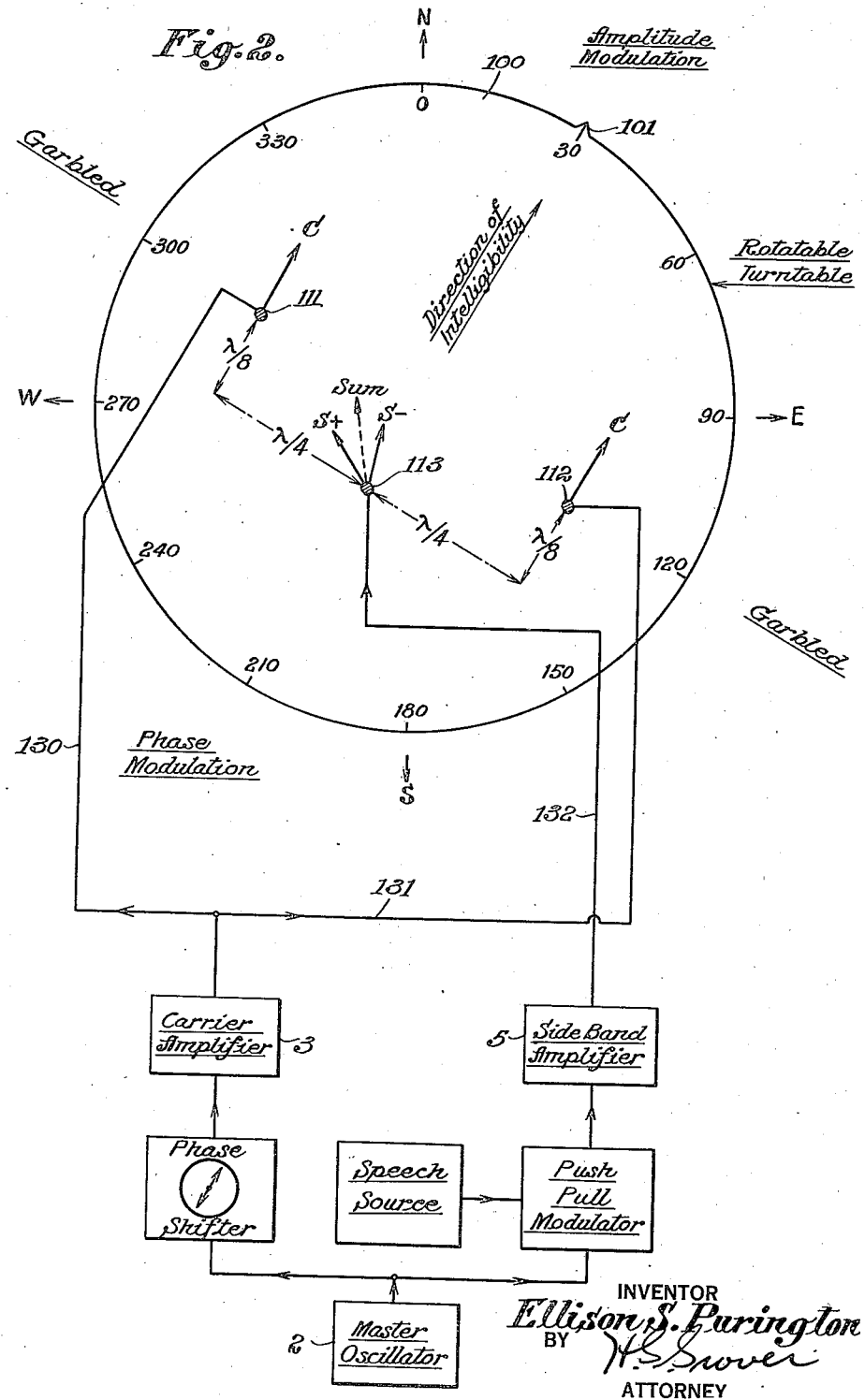

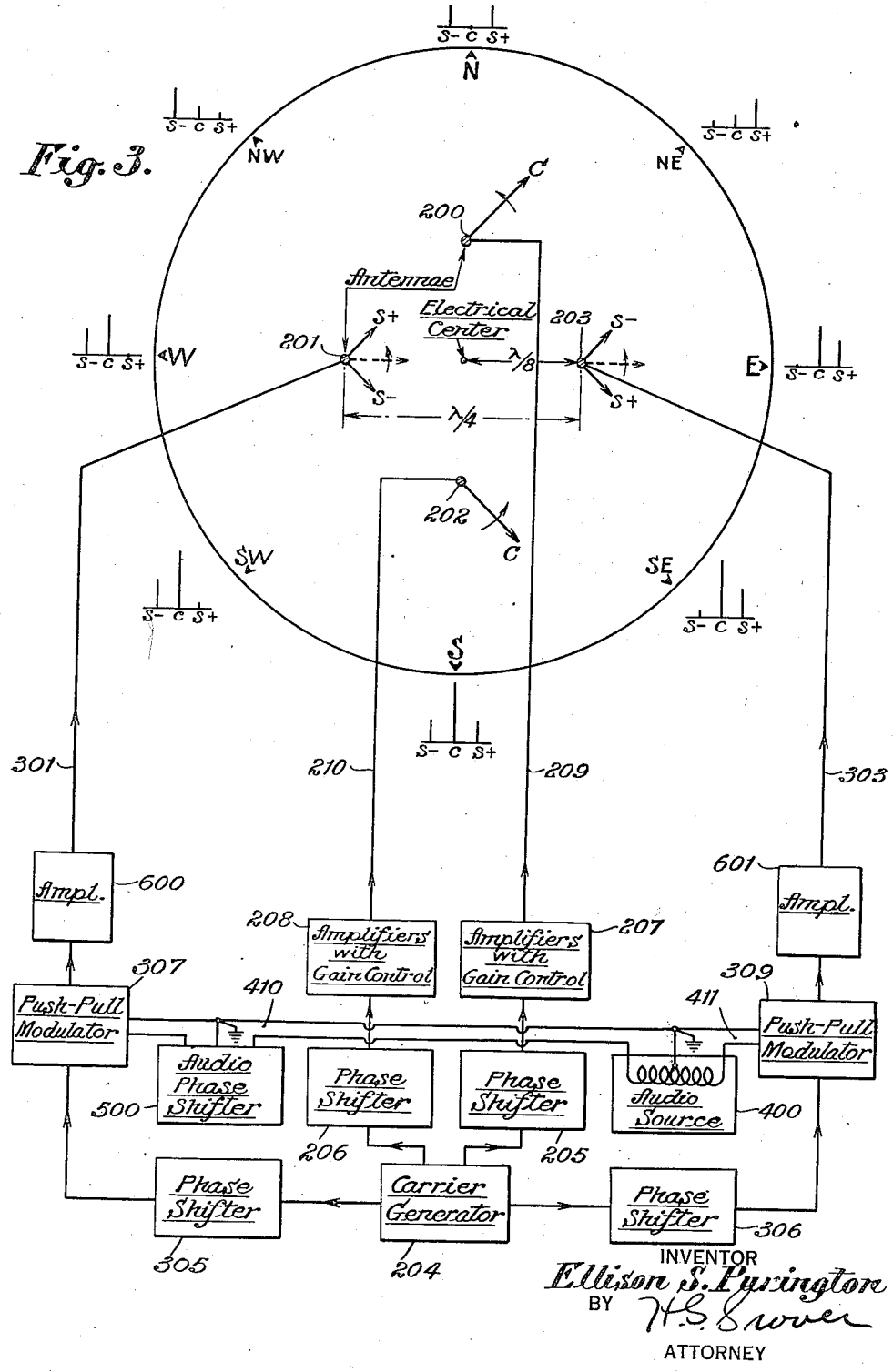

Jan. 16, 1945.    E. S. PURINGTON    2,367,372
RADIO DIRECTIONAL INDICATION SYSTEM
Filed Jan. 4, 1941    4 Sheets-Sheet 4
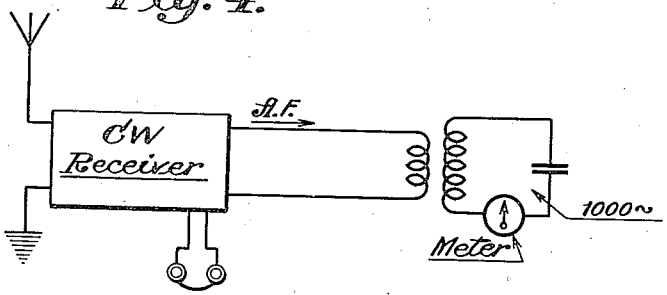
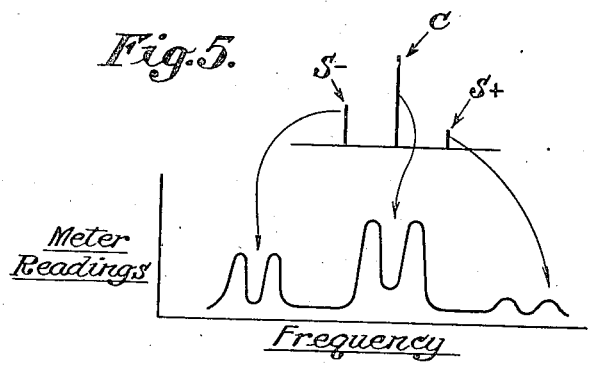
INVENTOR
Ellison S. Purington
BY
ATTORNEY Patented Jan. 16, 1945

2,367,372

UNITED STATES PATENT OFFICE 2,367,372

RADIO DIRECTIONAL INDICATION SYSTEM

Ellison S. Purington, Gloucester, Mass., assignor, by mesne assignments, to Radio Corporation of America, New York, N. Y., a corporation of Delaware Application January 4, 1941, Serial No. 373,061

14 Claims. (Cl. 250—11)

My present invention relates to radio directional indication systems, and more particularly to radio systems utilizing rotary intelligibility.

The broad purpose of this invention is to provide a radio system by which mobile craft, such as boats, aircraft and the like, can be advised of their directional location from a relatively fixed base in a simple and direct manner, the system using ordinary non-directional receivers. The use of rotary directional beams is well known in the art. In the prior art the signals are differently directionally characterized as to strength of the signal as a whole. In the present invention, however, the signals are otherwise differently directionally characterized. One example is the directional properties as to intelligibility for use with telephonic receivers. Another example is the directional properties as to relative strengths of the continuous wave equivalents of a modulated wave for use with continuous wave receivers. A common property of both examples is that the relations of carrier and side bands are not the same for all directions.

The present invention, then, may be said to relate, in one aspect, to rotary intelligibility. That is, the transmitting station is so constructed that intelligible speech can be projected in one direction, and this direction can be designated by a talking voice. For example, the telephonic voice can be made to call the bearings for intelligible reception as the direction is changed to successive points of the compass, and the correct bearing will be that which the receiving operator understands.

This result is accomplished by using a plurality of antennae, or radiators, with carrier energy impressed on some and sideband speech energy impressed upon others. The geometrical distribution of the antennae, and the timing of the signals, are such that the signals combine to produce an amplitude modulated wave form in one direction only. In other directions the wave form has the attributes of frequency modulation in varying degrees. This system permits a very accurate determination of position by measurement of wave form characteristics and indicating the relative amounts of amplitude and of frequency modulation present. For practical means the intelligibility of the signal in a standard amplitude modulation receiver will indicate direction sufficiently close for most purposes. If a frequency modulation receiver is used instead of an amplitude modulation receiver, then the signal, instead of being intelligible when the intelligibility beam is directed to the receiver, will of course vanish. A combination of the two types of receivers could be used for higher precision work; one giving the advantages of null indication, and the other of direct telephonic information.

Another important object of this invention is to provide a radio beacon system wherein direction is indicated by the relative strength of the carrier and two sidebands, and the beacon may be continuously operating with fixed characteristics thereby not requiring any rotating device. If the modulating frequency is high, or super-audible, the determination of directional location can be made by a continuous wave type receiver affording a greater distance range of operation than is possible with a broadcast type receiver. Alternatively, the system could be organized so that indication may be made by comparison of strengths of signals with a radio receiver with dual detectors.

Still other objects of my invention are to improve radio directional systems, and more especially to simplify the construction thereof and render them more economical in manufacture and assembly.

The novel features which I believe to be characteristic of my invention are set forth in particularity in the appended claims; the invention itself, however, as to both the organization and method of operation will best be understood by reference to the following description taken in connection with the drawings in which I have indicated diagrammatically several circuit organizations whereby my invention may be carried into effect.

In the drawings—

Fig. 1 shows a transmitting system which is adapted to produce a signal which is directionally intelligible in two directions 180 degrees apart, Fig. 2 illustrates a modification wherein intelligible transmission is produced solely in one direction, Fig. 3 shows a further modification wherein four antennae are used, and direction is determined by measurement of relative strengths of carrier and side band frequencies of a composite wave, Fig. 4 shows a receiving system of the type used in connection with the system of Fig. 3, Fig. 5 graphically shows the operation of the measuring system of Fig. 4.

Referring, now, to the accompanying drawings, wherein like reference characters in the different figures designate similar circuit elements, in Fig. 1 two antennae, or other signal radiators, are separated by a quarter wave length. Let it be assumed, by way of example, that the two antennae are vertically arranged on a mount, or base, 1 (shown in dotted lines). For convenience these antennae are assumed to be laid out in an East-West arrangement.

The spaced antennae could be located along with the associated transmitter equipment (to be described in detail) at a fixed location, as, for example, at a lighthouse reservation on a coast. Again, the equipment and antennae could be located on a mobile craft, such as the mother ship of a fleet; standard communication receivers being located on different units thereof. Regardless of the location of the equipment and antennae, there is fed to one antenna part of the radiations making up the complete signal wave, while another part is fed to the other antenna. Hence, there is radiated a total signal wave having what may be termed "rotary intelligibility." That is to say, the signal has different tonal qualities in different directions. For example, in one direction the signal wave appears as an amplitude modulated wave, whereas in other directions it would appear as a phase modulated wave. In the simplest embodiment of the invention, as presented in Fig. 1, the carrier component of the total modulated carrier wave desired to be radiated is fed to, and radiated from, one antenna, say "antenna 1," while the modulation side band frequencies are fed to, and radiated from, the "antenna 2." The radiated carrier and side bands combine in different phase relations at different points of the compass.

The vector C at "antenna 1," and S+, S— at "antenna 2," represent the magnitude and phase of the carrier C and two side bands S+ and S— of the complete radiation which compounds at a distance to make a desired telephonic signal. In the illustration shown, the phase of the carrier, about 75 degrees, is the same as the phase of the vector sum of the sideband modulation vectors. For a wave originating at "antenna 1" and travelling toward the east, the phase of the wave in the vicinity of "antenna 2" is 90 degrees in advance of the phase of the wave in the vicinity of "antenna 1."

As well known in the art, amplitude modulation is characterized by the side bands being equal, and less than half the carrier, with the vector sum of the side bands at any instant of time being of the same electrical phase as the carrier. In "quasi-phase" modulation, described in my U. S. Patent 2,020,327, referring to U. S. Patents to Hammond, 1,935,776 and 1,976,393, the vector sum of the side bands at any instant of time differs in phase from the carrier by 90 degrees.

Therefore, it is evident that the two radiations from the antennae with the carrier and the sum of the sidebands in phase will produce amplitude modulations at any point equi-distant from the antennae; that is, along the north-south line. They will produce quasi-phase modulation at any point for which the distances from "antenna 1" and "antenna 2" differ by a quarter wave length in space, corresponding to a 90 degree shift of phase in one of the radiations in passing from one antenna to the other. That is, quasi-phase modulation results at any point on the east-west line. For example, the radiation to the east from the antennae is of the same precise nature as though "antenna 1" were non-radiating, but at the other antenna there were a carrier $C^1$ (shown in dotted line) in quadrature relation to the vector sum of S+ and S—.

Under these conditions, therefore, in a north or south direction, maximum response will occur in an amplitude modulation receiver, minimum in a "timing modulation" receiver. In an east or west direction minimum response will occur in an amplitude modulation receiver, and maximum in a timing modulation receiver. By "timing modulation" receiver is meant a receiver capable of receiving phase or frequency modulated carrier waves. If the signals are of spoken words, as in telephonic communication, greatest intelligibility will result in an amplitude modulation receiver in the north or south direction, and minimum in an east or west direction. It will be understood that the direction for amplitude modulation can be altered by shifting the relative phases of the carrier at "antenna 1" and the sum of the sideband vectors at "antenna 2."

In Fig. 1, for example, is shown (partly in block diagram) one method of producing and controlling the energy at the radiators. This includes a master oscillator, or generator 2, part of the output thereof being delivered through a phase shifter 4 and a carrier amplifier 3 to "antenna 1." Another part of the oscillator output is fed to a push-pull modulator. The side bands, produced therein by the action of the output energies of the carrier source 2 and the speech circuit, proceed through a side band amplifier 5 to "antenna 2."

More specifically, the master oscillator 2 may be constructed in any well known manner to produce radio frequency oscillations of a desired frequency. The phase shifter comprises the elements 11 to 16. It functions to determine the relative phases of radio frequency energy used in exciting the two channels which terminate in the two radiators. The junction of resistors 11 and 12 is connected to one of the lead lines to the oscillator, whereas the junction of coils 14 and 15 is connected to the other oscillator lead. Resistor 11 and inductance 14 are arranged in series to provide one primary arm of the phase shifter. Resistor 12 and inductance 15 similarly provide a second series primary arm with condenser 13. Both primary arms are in parallel. The constants of the elements of the arms are so proportioned and selected that the currents through them are substantially equal in magnitude, but substantially in phase quadrature.

This may be accomplished, for example, by choosing the elements 11, 12, 14 and 15 of the same numerical impedance at the operating frequency, condenser 13 being double the numerical impedance of the other elements. Coils 14 and 15 are so arranged as to have their axes at right angles so that there is no reactive coupling between them. The rotor coil 16 is arranged on a rotatable shaft so that it may be coupled to either coil, or partly to both coils. While the physical arrangement of the coils 14, 15 and 16 is immaterial to the present invention, it is pointed out that coils 14 and 15 may be arranged to provide a cage within which is located the rotor coil 16. Within the space inside the cage a field similar to the rotating field of a two phase induction motor is created. Hence, by suitably adjusting the angular position of the rotor 16 a voltage may be developed in the latter with any desired phase relation between the induced voltage and the voltage impressed upon the primary arms of the phase shifter. The phase shifter, in general, may be of any continuously variable type which has two sets of coils at right angles in space, and is capable of being excited by carrier currents at right angles in time.

The aforesaid coil 16 in the center of symmetry, and variably coupled to the two other sets of coils, provides for controlling the phase of the output. Voltage from the rotor coil 16 of the phase shifter is impressed upon the third, or outer, grids of electron discharge tubes 23 and 24 in a balanced manner. These grids are bridged by series resistors 17—19—18, the resistor 19 being a potentiometer. In shunt with the series resistors is provided the dual capacitor 20—21—22. The bridging elements function to correct for tube inequalities of conductance and capacitance thereby making the plate currents of the balanced tubes equal at radio frequency. The potentiometer 19 also functions to bias the grids 23' and 24' at ground potential.

The tubes 23 and 24 also are driven from an audio frequency source which may be a speech source providing voice signals, or it may be an audio oscillator. The audio signals are transmitted through the transformer 30 to the first, or signal input, grids of tubes 23 and 24. These signal input grids are connected to the opposite ends of the secondary winding of transformer 30. The common cathodes are connected to the mid-point of the secondary winding through a path including resistor 34. Hence, it will be seen that the audio signals are impressed upon the inner grids of tubes 23 and 24 in a balanced manner. The positive potential for the plates of the push-pull modulator tubes 23 and 24 is fed through a radio frequency choke coil 36. Potentiometer 33—32 permits reduction of the positive voltage to a value sufficient to permit the middle grids of the tubes to function as positive screen grids. The resistor 35 functions to establish grids 23' and 24' at a negative potential with respect to the audio signal input grids.

It will now be seen that tubes 23 and 24 and their associated circuits provide a balanced modulator developing voltage across coil 38 which is substantially composed of solely side band frequency components. Those skilled in the art are fully acquainted with the theoretical basis for the balancing action, and it is known that the carrier is eliminated from the voltage produced across coil 38, the original audio modulation frequencies also being eliminated. The radio frequency side band component frequencies are transmitted through blocking condenser 39 to the succeeding utilization circuit, which, in this case, is an amplifier for the side band frequency voltages. The latter is not specifically shown, since those skilled in the art are fully aware of the construction thereof. The amplified side band energy is transmitted to "antenna 2." Simultaneously, carrier voltage from across the primary arms of the phase shifter is fed to the carrier amplifier 3, and the amplified carrier energy is transmitted to "antenna 1." At a point distant from the two antennae the fields due to the carrier and side bands synthesize to form a composite field, the nature of which depends upon phase relationships. In Fig. 1 the carrier, upper side band frequencies and lower side band frequencies are represented respectively by the vectors C, S+ and S—.

The shifter rotor coil may be provided with an indicating dial, or pointer, which may be set so that compensating for different distances of transmission lines from the transmitter equipment to the antennae, the dial will indicate north and south when the radiations to the north and south directions represent amplitude modulation. Such a dial could be rotated manually simultaneously with announcement of the direction for amplitude modulation made at the speech source by a speaker. On the other hand, it may be mechanically geared to a mechanical announcer, such as a phonograph or film record, so that automatic operation of the rotor will be had.

The various types of radiation existing around the different points of a compass at points remote from the antennae are produced from the concurrent functioning of both antennae. At any point in the plane of the compass directions amplitude modulation and quasi-phase modulation may be produced depending upon the setting of the phase shifter. All points in a given direction, say northeast, will have the same modulation neglecting any selective fading effects. Thus, the same type of signal will result two miles to the northwest as five miles to the northwest. It is because the type of signal varies with the direction of the beacon that directional effects may be produced. Hence, it may be said that the nature of the signals, that is the phase relation between the side bands and the carrier, in any direction depends firstly upon the relative radio phases of the carrier component at one antenna and the suppressed carrier corresponding to the bisector of the side band component vectors at the other antenna; secondly, upon the configuration of the antennae as to spacing distance; and, thirdly, upon the angular bearing of the direction of the distant point with respect to a line between the two antennae.

The nature of the signals, as stated before, can be determined at any distant point by listening on a standard broadcast receiver, or by using a measuring instrument. With a standard amplitude modulation receiver which is tuned to the carrier frequency, and assuming the receiver located at a compass point where quasi-phase modulated signals are collected, the response will be weak and high pitched in comparison with signals due to an amplitude modulated signal with the same strength of each component. With a single frequency of modulation, say 500 cycles, the received signal when amplitude modulated will be nearly completely 500 cycles with receivers using linear detectors. On the other hand with quasi-phase modulation the received signal will be void of any 500 cycle component and the strongest component will be 1000 cycles. For side frequencies each 50% of the carrier, the 1000 cycle tone due to quasi-phase modulation will be about 15 decibels lower in volume than the 500 cycle tone due to amplitude modulated signals. For smaller ratio of side bands to carrier the difference will even be greater. It will be understood that the distance of a quarter wave length between the radiators is used for illustrative purposes and that a lesser or greater separation might be used.

While the system of Fig. 1 is given to show the basic principle of operation, it will be understood that many modifications are possible involving applying side band energy to some radiators, and carrier energy to other radiators to produce a system with directional intelligibility. In Fig. 2, for example, three radiators are arranged on a turntable arrangement whereby a beam is made up with directional intelligibility in one direction only. In place of using adjustable phase shifting devices the phase relations of this system may be fixed, and the system as a whole rotated. The transmitter equipment could be mounted on the turntable 100.

In Fig. 2, two antennae 111 and 112 are provided for the radiation of carrier energy. They are separated by a half wave length along a line transverse to the direction of good intelligibility. These antennae are energized by currents of the same frequency and of the same phase. As a result carrier energy is radiated best at right angles to the line joining the two radiators. In the illustration of Fig. 2 this is at a compass bearing of about 30 degrees or 210 degrees measured clockwise from north. A third antenna 113 is located an eighth of a wave length from the line joining antennae 111 and 112, and is preferably equidistant from them. This antenna 113 is energized with side band energy. The phase of the vector sum of the two side bands is 45 degrees different from the phases of the radio carriers at their respective antennae. As a result, at a distance in the line at right angles to a line joining 111 and 112, the component radiations will compound into amplitude modulation in one direction, say at the bearing 30 degrees, and into quasi-phase modulation at the opposite bearing of 210 degrees. Therefore, the signals can be received with good intelligibility by an amplitude modulation receiver located at bearing 30°. The turntable may be provided with an index 101 to facilitate the setting of the turntable. In the direction with bearings 120° and 300°, the carriers radiated from antennae 111 and 112 are balanced out and side band energy only is radiated in these directions. This results in poor intelligibility in any type of receiver. Therefore, good intelligibility exists only in the direction at which the turntable is set. The words "garbled" indicate the directions in which poor intelligibility results.

The circuit for energizing the antennae arrangement of Fig. 2 is similar to that of Fig. 1, except that two transmission lines 130—131 of equal length would be run from the carrier amplifier 3 to the antennae 111 and 112. One line 132 would be run from the side band amplifier 5 to antennae 113. The phase shifter would have its rotor set to give proper relative phase relation between the sum of the side bands and the carriers to give proper sense to the direction of intelligible transmission for amplitude modulation reception.

In Figs. 1 and 2 systems of radio direction indicating have been described in which intelligibility is dependent upon the direction of a broadcast type receiver from a transmitting station using a plurality of antennae. In the application of such systems a phase shifter device, or a mechanical mount for the antennae must be adjusted. In the arrangement of Fig. 3, however, direction is uniquely determined by measurement of the relative strengths of the carrier and side bands of a composite wave produced by modulation methods. Both side bands need not necessarily be of equal strength, and continuous wave reception may be employed by a communications type receiver.

In Fig. 3, for example, four antennae structures 200 to 203 are located to the north, west, south and east of the electrical center of the system, each antenna being an eighth of a wave length from the electrical center. The north and south antennae, separated by a quarter wave length, are excited by carrier wave energy, and the east and west antennae also separated by a quarter wave length, are excited by side band energy. The carrier energies are different 90 degrees in phase. Due to the quarter wave length separation and proper choice of phasing, the carrier energy is radiated additively to the south and subtractively to the north, but equally to the west and to the east. As a result the net radiation to the north is zero, and to the south a maximum. The radiation is the same for any two directions which are the same number of degrees clockwise as counter-clockwise from the north. These relations between the carrier component C and the side band components S+ and S— are indicated in Fig. 3 around the compass points.

The upper side band energy is radiated most effectively to the east and equally toward the north and south, whereas the lower side band energy is radiated most effectively to the west and equally toward the north and south. As a result, and as clearly shown in Fig. 3, the relative strengths of the lower side band, carrier and upper side band energies indicate uniquely the direction of a receiver from the beacon. These can be checked by continuous wave field strength indicating apparatus, or by use of a tuned indicating circuit in the output of a communications type continuous wave receiver. With the carriers equal to twice each of the side bands, the relative strength of the three constituents of the composite wave for eight directions are as tabulated below:

| Compass bearing | Angular bearing | Lower frequency | Carrier frequency | Upper frequency |
|---|---|---|---|---|
| N | 0 | 1.414 | 0.0 | 1.414 |
| NE | 45 | .44 | 0.88 | 1.95 |
| E | 90 | .000 | 2.8 | 2.00 |
| SE | 135 | .44 | 3.8 | 1.95 |
| S | 180 | 1.414 | 4.0 | 1.414 |
| SW | 225 | 1.95 | 3.8 | .44 |
| W | 270 | 2.000 | 2.8 | 0.0 |
| NW | 315 | 1.95 | 0.88 | .44 |
| N | 360 | 1.414 | 0.0 | 1.414 |

Thus, by tables, or charts, involving the ratio of the upper and lower side frequency signals, and the ratio of the carrier to the mean of the upper and lower side frequencies, the desired direction is readily determined.

For higher speed work, when the mobile craft is near the beacon, a receiver may be used in which some of the carrier and one side band are diverted by filter means to one detector, some of the carrier and the other side band are diverted to another detector, and some of the two side bands to a third detector. A comparison of the three detected outputs will then uniquely determine the direction of the receiver from the transmitter. Again, in landing field operation the three dimentional patterns could be utilized. For example, in approaching a field from the south, the inequality of the detected energies between the carrier and the upper and lower side bands will indicate left or right deviation from the desired approach. Directly over the field the received signal represents 100 percent pure amplitude modulation; to the south less than 100 percent; and to the north over-modulation. To the east or west phase modulation is present in varying degrees, as indicated by the difference of the two side bands.

The design of circuits to produce this type of radiation from a beacon involves phase shifting devices, push-pull modulation devices, etc., and can be readily constructed by those skilled in the art. Inspection of the diagram of Fig. 3 indicates that for the west antenna 201 the angle between S+ and S— is 90 degrees and increasing, since vector S+ is rotating faster than vector S—. For the east antenna 203 it is 90 degrees and diminishing, that is 270 degrees. For antenna 201 the modulation cycle is 45 degrees beyond the condition of maximum sum of the two vectors S— and S+. For antenna 203 the modulation cycle is 45 degrees short of the condition of maximum sum. Therefore there is a difference of 90 electrical degrees between the modulations for the two radiators 201 and 203. These two radiations can be built up by two push-pull modulators involving four tubes with, for example, all control grids actuated in phase from the radio source, and the suppressor grids actuated from the audio for one push-pull modulator 90 degrees differently than for the other push-pull modulator.

The vectors of Fig. 3 represent conditions at one instant of the radio and modulating cycle. At later times the vectors S—, C and S+ may be thought of as rotating counter-clockwise with S+ at the highest rate, S— at the lowest rate and C at the average rate. It will be noted that if at any time, as at the instant indicated, a proper phase relationship between two like speed vectors, say S—, is established at the two antennae 201 and 203, this proper phase relationship will be maintained since S— rotates at the same speed for both antennae. Due to the probable inequalities of lengths of transmission lines from the oscillation generating mechanism to the antennae, individual phase shifters for each of the four channels may be used to make adjustments. The design of transmitting equipment and receiving equipment for practicing this invention can be accomplished on the basis of general directions here given, and apparatus lined up in accordance with the requirements of Fig. 3. Hence, the various networks feeding the four antennae are schematically represented.

The carrier generator 204 may be of any type, and the carrier oscillations are fed to phase shifters 205 and 206. Each phase shifter may be constructed, if desired, in the manner explained in Fig. 1. The carrier amplifiers 207 and 208 are preferably equipped with gain control devices to maintain a uniform carrier amplitude feed over lines 209 and 210 to antennae 200 and 202 respectively.

The antennae 201 and 203 are fed with side band energy over lines 301 and 303 respectively. The side band energy may be produced in a manner shown in Fig. 1. Thus, carrier energy from 204 is fed to each of phase shifters 305 and 306. Each phase shifter feeds its carrier output to a push-pull modulator. Each of the modulators 307 and 309 may be constructed as shown in Fig. 1. The audio voltage is applied from a source 400 which feeds audio modulation signals to each of modulators 307 and 309 over lines 410 and 411 respectively. An audio phase shifter 500 is coupled to lines 410 and 411. The phase shifter functions to establish a proper difference of phase of the modulation in 307 and 309 so that with the radio phase shifter 305 and 306 properly set, S+ at 201 leads S+ at 203, and S— at 203 leads S— at 201 by 90 electrical degrees. The side band energy outputs of the modulators 307 and 309 are respectively fed to amplifiers 600 and 601.

The purpose of the phase shifter 500, as stated, is to excite one of the push-pull modulators properly out of phase to make up the two signals at 201 and 203 in a correct manner. Universally in this arrangement when a maximum is desired in a given direction due to two radiations from antennae separated a quarter wave length, the radiation that has a quarter wave farther to travel is advanced in phase at the point of origin by 90 electrical degrees. Thus, for east radiation, in which S+ is desired to be a maximum, S+ at far point 200 leads S+ at 203 by 90°. For the west radiation, in which S— is desired to be a maximum, S— at far point 203 leads S— at 201 by 90°. For south direction, in which the carrier C is desired to be a maximum, C at the far point 200 leads C at 202 by 90°.

For the reverse condition of producing a minimum of radiation in a given direction, the radiation originating at the far point lags 90 degrees behind the radiation at the near point. Thus, for east radiations in which S— is desired to be zero, the S— radiation at far point 200 lags 90 degrees behind the S— radiation at 203. There are other requirements. For example, the S— and S+ radiations to the north and south must be equal. Here the distances are the same for radiations originating at 200 and 203, and the effects are the same as if the radiation started both at the electrical center, with S+ a single vector equal to the vector sum of S+ at 201 and S+ at 203. These two vectors are at right angles, and equal, therefore the vector sum is 2 times either. Similarly, for S—. Accordingly, the north-south requirements for S— and S+ are met.

These two side frequency sum vectors are in phase, lying as shown toward the east. It is irrelevant as to operation how the side frequency sums are related to the carrier, but the arrangement is such that the carrier referred to the electrical center also lies in an eastward direction, with amplitude modulation resulting in the southerly direction. The pictorial representations by rotating vectors can show how things stand at a particular instant of time. At future times, visualize the vectors C, S— and S+ to be all rotating counter-clockwise with S+ vectors rotating faster than C, and S— slower than C. The radio cycle and modulation cycle proceeds. Referring to 201, the S+ vector rotates more rapidly than S—, and is already 90 degrees ahead, so that the angle between the two is on the increase. But at 203, the faster moving vector S+ starts 90 degrees behind the slower moving vector S— and the angle between the two is on the decrease. After the modulation cycle proceeds 45 electrical degrees, S+ and S— at 203 will be in the same direction, with a maximum value of their vector sums. S+ and S— at 201 will be in opposite direction with a zero value of their vector sums.

In other words, the phases of the modulation cycles for the radiations at 201 and 203 differ by 90 electrical degrees, which require push-pull modulator 307 to be driven by audio signals 90 degrees different from the audio signals on 309. Accordingly, it will be seen that audio phase shifter 500 is used for the purpose of making the phase of the audio voltage impressed upon 307 differ suitably from the phase of the audio voltage impressed upon 309, whereby correct relations may be established between the S+ and S— radiations at 201 and 203.

Fig. 4 shows a continuous wave (CW) receiver whose audio output is impressed upon a tuned indicating circuit. The tuned indicating circuit may be adjusted to 1000 cycles, and a meter included in the circuit to indicate the response at the upper and lower side band frequency as well as at the carrier. It will be understood that the signals can be readily measured for relative values by the use of a continuous wave receiver of sufficient selectivity. The wave frequencies may be separated 5000 to 50,000 cycles as may be needed. With steady waves and superheterodyne receivers equipped with crystal control and an output meter, the relative values of the three field strengths may be determined using a carrier of the order of 10,000 kilocycles.

The radiations are entirely equivalent to three continuous waves, and are receivable by continuous wave methods. The dial of the CW receiver must be set in the vicinity of S—, C and S+ in succession. If we think of a simple receiver, and not the more complex superheterodyne, a 1,000 cycle tone results in the output when the receiver is set either 1,000 cycles above or 1,000 cycles below exact tuning of the local oscillator with the incoming signal. This tone has nothing to do with the frequency of the audio source 400. The meter circuit of Fig. 4 is tuned to a frequency much lower than that of the audio source 400 to cut out any audio tone corresponding to this audio source 400, and, also, to give a fixed reference frequency to work with in making the measurements. For example, the audio response of the receiver at 600 cycles and at 1500 cycles might be entirely different, and it is better to use the same audio frequency beat tone in determining the values of S—, C and S+. By using a tuned audio system this is automatically cared for.

Fig. 5 graphically shows the type of readings which are secured on the meter, the lower curve showing the meter readings at different frequencies, while the upper curve shows the translation into relations between S—, C and S+. The center double peak represents the strength of the carrier wave. The X abscissa of the curve represents setting of the local oscillator of the continuous wave receiver. Halfway between the two central peaks, the local oscillator is synchronized with the carrier. The receiver is not of the A. V. C. type, and the audio response is proportional to the field strength of the incoming signal. For example suppose the "carrier" is 500,000 cycles, and the side bands are 480,000 and 520,000 cycles, which are 20,000 cycles different from the carrier. Using a simple receiver, the frequencies at which the local oscillator are set to produce 1,000 cycle beats are: for S—, 479,000 and 481,000: for C, 499,000 and 501,000; and for S+, 519,000 and 521,000 cycles. Suppose the readings of the meter at the peak of tuning as the receiver is adjusted from lowest to highest frequency are 2, 2, 17, 17, 6, 6. Then the lower side band is 11.8% of the carrier, and the upper side band is 35% of the carrier. From tables of ratios of the side bands to the carrier for different directions from the transmitter, the direction is readily determined.

In addition to the obvious advantage of explicitness of direction, the system of Fig. 3 has the advantages of sensitiveness in that receivers may be tuned for maximum response instead of being adjusted for null indications; sensitiveness in that CW methods are employed; simplicity and universability of all CW receivers to be used for direction finding. In general, Fig. 3 shows a direction finding system in which the bearing of a beacon is determined at a remote point by measurements of the relative strengths of a plurality of continuous wave signals which are radiated from the beacon.

While I have indicated and described several systems for carrying my invention into effect, it will be apparent to one skilled in the art that my invention is by no means limited to the particular organizations shown and described, but that many modifications may be made without departing from the scope of my invention, as set forth in the appended claims.

What I claim is:

1. A system of radio direction indicating comprising a plurality of radiators arranged in a predetermined wavelength separation, means for impressing carrier energy on at least one of said radiators, a single modulation source, means for impressing side band energy derived from solely said source upon at least one of the other radiators, said radiators being spaced a quarter of a wavelength apart, the phase relations between the energies at the two radiators being chosen so that at any instant the carrier and vector sum of the side bands are in phase thereby providing a beacon for which the detected energies corresponding to the frequency of modulation and its harmonics is a function of the direction of a receiver from the beacon.

2. A system of radio direction indicating comprising a plurality of radiators spaced a predetermined fractional wavelength apart, means for impressing carrier energy on at least one of said radiators, a single audio modulation source, means for impressing audio side band energy derived solely from said source upon at least one of the other radiators, said radiator spacing being a quarter of a wavelength, and the phase relations between the carrier energy and the vector sum of the side bands being such as to provide a beacon for which the detected energies corresponding to the frequency of modulation and its harmonics is a function of the direction of a receiver from the beacon, whereby the intelligibility of the transmissions in a broadcast type amplitude modulation receiver or phase modulation receiver is a function of direction.

3. A system of radio direction indicating comprising a plurality of spaced radiators, means for impressing carrier energy on at least one of said radiators, means for impressing side band energy upon at least one of the other radiators thereby providing a beacon for which the detected energies corresponding to the frequency of modulation and its harmonics is a function of the direction of a receiver from the beacon, and a mechanical rotating device mounting the spaced radiators for changing the directional properties of the radiated energies.

4. In combination, a plurality of spaced radiators, means for putting unmodulated carrier energy on at least one of said radiators, a single modulation source, means for applying side band energy derived from said carrier energy and said modulation source, on at least another of said radiators, said side band energy being free of carrier component, said two radiators being spaced a quarter of a wavelength apart, and the carrier at said one radiator and vector sum of the side bands at the other radiator having an in-phase relation whereby the radiated energies will synthesize to provide modulated carrier signals in different directions which will be differently characterized.

5. A method of radio direction indication which is dependent upon the character of modulation of a carrier at different compass points, which includes generating carrier oscillations, generating modulation signals at a single source, combining the modulation signals from solely said source and carrier oscillations to produce upper and lower modulation side bands with suppressed carrier, radiating from a relatively fixed point on the earth's surface solely said carrier oscillations, radiating from at least a second relatively fixed point which has a predetermined fractional wavelength spacing from the first point said modulation side bands and maintaining a phase difference between the carrier and the vector sum of the side bands which is so related to said spacing that the carrier energy and side band energy radiated from said points will synthesize to provide modulated carrier energy at remote points whose phase relation between carrier component and side bands is a function of direction.

6. A method which includes generating carrier oscillations, generating modulation signals at a single source, combining the modulation signals from solely said source and carrier oscillations to produce upper and lower modulation side bands with suppressed carrier, radiating from a relatively fixed point on the earth's surface solely said carrier oscillations, and radiating from at least a second relatively fixed point said modulation side bands maintaining said two fixed points spaced by a predetermined wave length separation and maintaining an in-phase relation between said carrier and the vector sum of the side bands at said two radiation points whereby the radiated energies combine to provide an amplitude modulated carrier wave in one direction and a quasi-phase modulated carrier wave in a direction normal thereto.

7. A method which includes generating carrier oscillations, generating modulation signals, combining the modulation signals and carrier oscillations to produce upper and lower modulation side bands with suppressed carrier, radiating from a relatively fixed point on the earth's surface solely said carrier oscillations, and radiating from at least a second relatively fixed point said modulation side bands, and radiating from a third relatively fixed point said carrier oscillations, and maintaining an equal and predetermined wave length separation between said second point and said first and third points.

8. A method of radio direction indication which is dependent upon the character of modulation of a carrier at different compass points, which includes generating carrier oscillations, generating audio modulation signals at a single audio source, combining the modulation signals from solely said source and carrier oscillations to produce upper and lower modulation side bands with suppressed carrier, radiating from a relatively fixed point on the earth's surface solely said carrier oscillations, and radiating from at least a second relatively fixed point said audio modulation side bands, and maintaining a predetermined phase relation between the carrier oscillations radiated from said first point and the said suppressed carrier such that at points remote from the two points said carrier oscillations and side bands combine to form modulated carrier waves whose phase relation between carrier component and modulation side bands is a function of direction.

9. A method which includes generating carrier oscillations, generating modulation signals at a single source, combining the modulation signals from solely said source and carrier oscillations to produce upper and lower modulation side bands with suppressed carrier, radiating from a relatively fixed point on the earth's surface solely said carrier oscillations, and radiating from at least a second relatively fixed point said modulation side bands, radiating said carrier oscillations from a third point which is spaced by a quarter wave length in geographical alignment from said first point, radiating said side bands from a fourth point which is spaced by a quarter wave length from said second point and in geographical alignment.

10. In a radio direction finding system of the type including at least two radiators having a predetermined wave length separation, the method which includes feeding to one of said radiators radio frequency energy of a predetermined carrier frequency, deriving from said carrier energy a second carrier energy, combining said second carrier energy with audio modulation signals from a single audio source to provide upper and lower audio side band energy with suppressed carrier, and feeding the said audio side band energy to the second of said radiators, maintaining the radiators a quarter of a wave length apart and the carrier energy at one radiator in phase with the suppressed carrier at the other radiator whereby the radiated carrier energy and radiated audio side band energy synthesize to provide composite signals of different characteristics at different compass points relative to the location of said radiators.

11. In a radio direction finding system of the type including at least two radiators having a predetermined wave length separation, the method which includes feeding to one of said radiators radio frequency energy of a predetermined carrier frequency, deriving from said carrier energy a second carrier energy, combining said second carrier energy with modulation signals from a single source to provide upper and lower side band energy with suppressed carrier, and feeding the side band energy to the second of said radiators whereby the radiated carrier energy and radiated side band energy synthesize to provide composite signals of different characteristics at different compass points relative to the location of said radiators and supplying said carrier energy to an auxiliary radiator arranged in geographic alignment with said one radiator, but being displaced therefrom by a distance equal to said predetermined separation.

12. A method which includes generating carrier frequency oscillations, generating modulation-representative signals at a single source, combining the modulation signals from solely said single source and carrier oscillations to produce upper and lower modulation side bands with suppressed carrier, radiating solely said carrier oscillations from one point, radiating solely said modulation side bands from at least a second point, radiating said carrier oscillations from a third point which is spaced by a quarter wave length in geographical alignment from said first point, and radiating said side bands from a fourth point which is spaced by a quarter wave length from said second point.

13. In a radio direction finding system of the type including at least two antennae having a quarter wave length separation, the method which includes feeding to one of said antennae energy of a predetermined carrier frequency, providing a second carrier energy in phase with the first carrier energy, combining said second carrier energy with audio modulation signals derived from a single source to provide upper and lower side band energy with suppressed carrier, and feeding the side band energy to the second of said antennae whereby the radiated carrier energy and radiated side band energy synthesize to provide composite signals of different characteristics at different compass points relative to the location of said antennae.

14. In a system of radio direction indication which is dependent upon the character of modulation of a carrier at different compass points, transmission means comprising a plurality of radiators spaced a predetermined wave length distance apart, means feeding carrier energy to at least one of the radiators, a single source of modulating signals, means for impressing modulation side band energy derived from said source and said carrier energy upon at least a second of the radiators, said carrier at said one radiator having a predetermined phase relation with respect to the vector sum of the side bands at said second radiator, a detection means at a point remote from the radiators responsive to the energies of all radiations from said radiators, said phase relation bearing a predetermined relation to said radiator spacing such that the character of the detection output is a function of the direction of the detection means from said radiators.

ELLISON S. PURINGTON.